(12) United States Patent
Heerdt et al.

(10) Patent No.: US 7,213,968 B2
(45) Date of Patent: May 8, 2007

(54) HOT MELT ADHESIVE DETECTION METHODS AND SYSTEMS

(75) Inventors: Dieter B. Heerdt, Gallatin, TN (US); Paul M. Jenkins, Hendersonville, TN (US)

(73) Assignee: Illinois Tool Works Inc., Glenview, IL (US)

(*) Notice: Subject to any disclaimer, the term of this patent is extended or adjusted under 35 U.S.C. 154(b) by 590 days.

(21) Appl. No.: 10/254,316

(22) Filed: Sep. 25, 2002

(65) Prior Publication Data

US 2004/0218660 A1    Nov. 4, 2004

(51) Int. Cl.
*G01J 5/00* (2006.01)

(52) U.S. Cl. .................. 374/129; 374/124; 374/121

(58) Field of Classification Search ............. 374/121, 374/4, 45, 53, 129, 124, 141, 110, 115, 120, 374/137, 100; 156/64, 351, 356, 357, 378, 156/379, 359; 250/338.1, 339.11, 359.1, 250/339.04, 339.14, 341.8, 349, 342; 118/665, 118/667, 669; 427/8–10; 702/81, 82, 134, 702/135, 172
See application file for complete search history.

(56) References Cited

U.S. PATENT DOCUMENTS

| | | | |
|---|---|---|---|
| 3,100,097 A * | 8/1963 | Woltersdorf | 246/169 D |
| 3,539,807 A * | 11/1970 | Bickel | 250/338.1 |
| 3,667,846 A | 6/1972 | Nater et al. | |
| 4,044,250 A | 8/1977 | Fetzer | |
| 4,215,939 A | 8/1980 | Miller | |
| 4,439,049 A * | 3/1984 | Hoogendoorn et al. | 374/124 |
| 4,458,152 A | 7/1984 | Bonora | |
| 4,626,389 A * | 12/1986 | Lempfer et al. | 264/40.7 |
| 4,704,603 A | 11/1987 | Edwards et al. | |
| 4,831,258 A | 5/1989 | Paulk et al. | |
| 5,081,359 A * | 1/1992 | Pompei | 250/349 |
| 5,220,169 A | 6/1993 | Ninomiya et al. | |
| 5,319,202 A | 6/1994 | Pompei | |
| 5,323,005 A * | 6/1994 | Merkel | 250/338.1 |
| 5,438,233 A | 8/1995 | Boland et al. | |
| 5,444,248 A * | 8/1995 | Ichien | 250/338.1 |

(Continued)

FOREIGN PATENT DOCUMENTS

DE    4304343    8/1994

(Continued)

OTHER PUBLICATIONS

LQ-Series Laser Module, WSTech (Product Brochure) 1999, (1 page).

(Continued)

*Primary Examiner*—Gail Verbitsky
*Assistant Examiner*—Mirellys Jagan
(74) *Attorney, Agent, or Firm*—Donald J. Breh; Mark W. Croll; Lisa M. Soltis (57) ABSTRACT

A hot melt adhesive sensing system and method including detecting (410) multiple areas of a target, for example, a hot adhesive material, by sensing changes in temperature with a corresponding number of thermal sensors, summing (420) an output of the thermal sensors, and evaluating (430) the summed output by comparing the summed output with a reference, the results of which may be assessed relative to a specified tolerance.

11 Claims, 6 Drawing Sheets

U.S. PATENT DOCUMENTS

| | | | |
|---|---|---|---|
| 5,582,663 A * | 12/1996 | Matsunaga | 156/64 |
| 5,663,565 A * | 9/1997 | Taylor | 250/339.11 |
| 5,676,790 A * | 10/1997 | Burrows | 156/353 |
| 5,717,485 A | 2/1998 | Ito et al. | |
| 5,839,829 A | 11/1998 | Litvin et al. | |
| 5,894,126 A * | 4/1999 | Pompei et al. | 250/338.1 |
| 5,915,295 A * | 6/1999 | Lauderbaugh | 100/38 |
| 6,026,881 A * | 2/2000 | Durso | 156/359 |
| 6,122,420 A | 9/2000 | Satoh | |
| 6,190,727 B1 * | 2/2001 | Thaggard | 427/9 |
| 6,196,714 B1 | 3/2001 | Bellifemine | |
| 6,217,695 B1 * | 4/2001 | Goldberg et al. | 156/244.17 |
| 6,425,687 B1 * | 7/2002 | Kulczyk | 374/115 |
| 6,452,180 B1 * | 9/2002 | Nistler et al. | 374/129 |
| 6,565,686 B2 * | 5/2003 | Bett et al. | 156/64 |
| 6,690,016 B1 * | 2/2004 | Watkins et al. | 250/359.1 |
| 6,854,496 B2 * | 2/2005 | Ishibuchi et al. | 156/351 |
| 2002/0036047 A1 * | 3/2002 | Ishibuchi et al. | 156/64 |
| 2004/0030514 A1 * | 2/2004 | Popp et al. | 702/81 |
| 2004/0052297 A1 * | 3/2004 | McDonald et al. | 374/121 |
| 2004/0083957 A1 * | 5/2004 | Latvis | 118/620 |
| 2004/0083958 A1 * | 5/2004 | Saidman et al. | 118/688 |
| 2004/0114661 A1 * | 6/2004 | Pompei | 374/121 |

FOREIGN PATENT DOCUMENTS

| | | |
|---|---|---|
| DE | 17508629 | 6/1998 |
| EP | 0852333 | 7/1988 |
| EP | 0373332 | 10/1990 |
| JP | 10101028 A * | 4/1998 |
| JP | 10119933 A * | 5/1998 |
| NL | 9401796 | 6/1996 |
| WO | 9634273 | 10/1996 |

OTHER PUBLICATIONS

TH Series Sensor, SUNX Sensors USA, West Des Moines, IA (1 page).

U.S. Appl. No. 09/542776, filed Apr. 4, 2000, Bolger.

* cited by examiner

HOT MELT ADHESIVE DETECTION METHODS AND SYSTEMS

FIELD OF THE DISCLOSURE

The disclosure relates generally to hot melt adhesive systems, and more particularly to the application and detection of hot materials, for example, hot melt adhesives deposited on substrates, methods and systems therefor.

BACKGROUND

The non-contact detection of beads of hot adhesives on moving conveyors by using infrared sensors that detect temperature differences between the adhesive and the substrate is known generally.

U.S. Pat. No. 4,831,258 entitled "Dual Sensor Radiation Detector" discloses for example a glue bead detection system comprising a dual sensor housing two thermopiles that detect an adhesive target and the reference moving conveyor temperatures, respectively, through a common lens. The thermopile outputs are coupled to an LED bar graph display that changes with changes between the temperatures of the adhesive target and the moving conveyor. A dynamic bar graph is indicative of intermittent adhesive beads, and a relatively constant bar graph is indicative of a relatively continuous adhesive bead.

In order to precisely detect the beginnings and ends of adhesive beads and other thermal materials, the sensor must be equipped with an optical focusing device, like the common lens in U.S. Pat. No. 4,831,258, but this limits the area that may be monitored by the sensor.

An object of the disclosure is to provide novel thermal detection methods and systems.

Another object of the disclosure is to provide thermal detection methods and systems that improve upon the art.

In one embodiment, the disclosure is drawn to a method in hot melt adhesive detection systems comprising generally detecting at least two separate areas of a target, for example, a hot melt adhesive, by sensing changes in temperature with a corresponding number of thermal sensors of the detector arranged non-parallel to a direction of relative motion between the detector and the target, and summing an output of the at least two thermal sensors. In some embodiments, the summed output of the sensors may be evaluated, for example, by comparing the summed output of the at least two thermal sensors with a reference.

In another embodiment, the disclosure is drawn to thermal sensing systems, for example, hot melt glue sensing systems, comprising at least two thermal sensors mounted in spaced apart relation, a signal summer having inputs coupled to outputs of the at least two thermal sensors, and a controller having an input coupled to an output of the signal summer, wherein the controller is programmed to sample and store the output of the summer in memory.

In yet another embodiment, the disclosure is drawn to thermal sensing systems, for example, hot melt glue sensing systems, comprising detecting a product, detecting hot melt glue disposed on the product while detecting the product, and comparing a period during which the product is detected with a period during which the hot melt glue is detected.

These and other objects, aspects, features and advantages of the present disclosure will become more fully apparent upon careful consideration of the following Detailed Description of the Disclosure and the accompanying Drawings, which may be disproportionate for ease of understanding, wherein like structure and steps are referenced generally by corresponding numerals and indicators.

DETAILED DESCRIPTION

Figure 1:
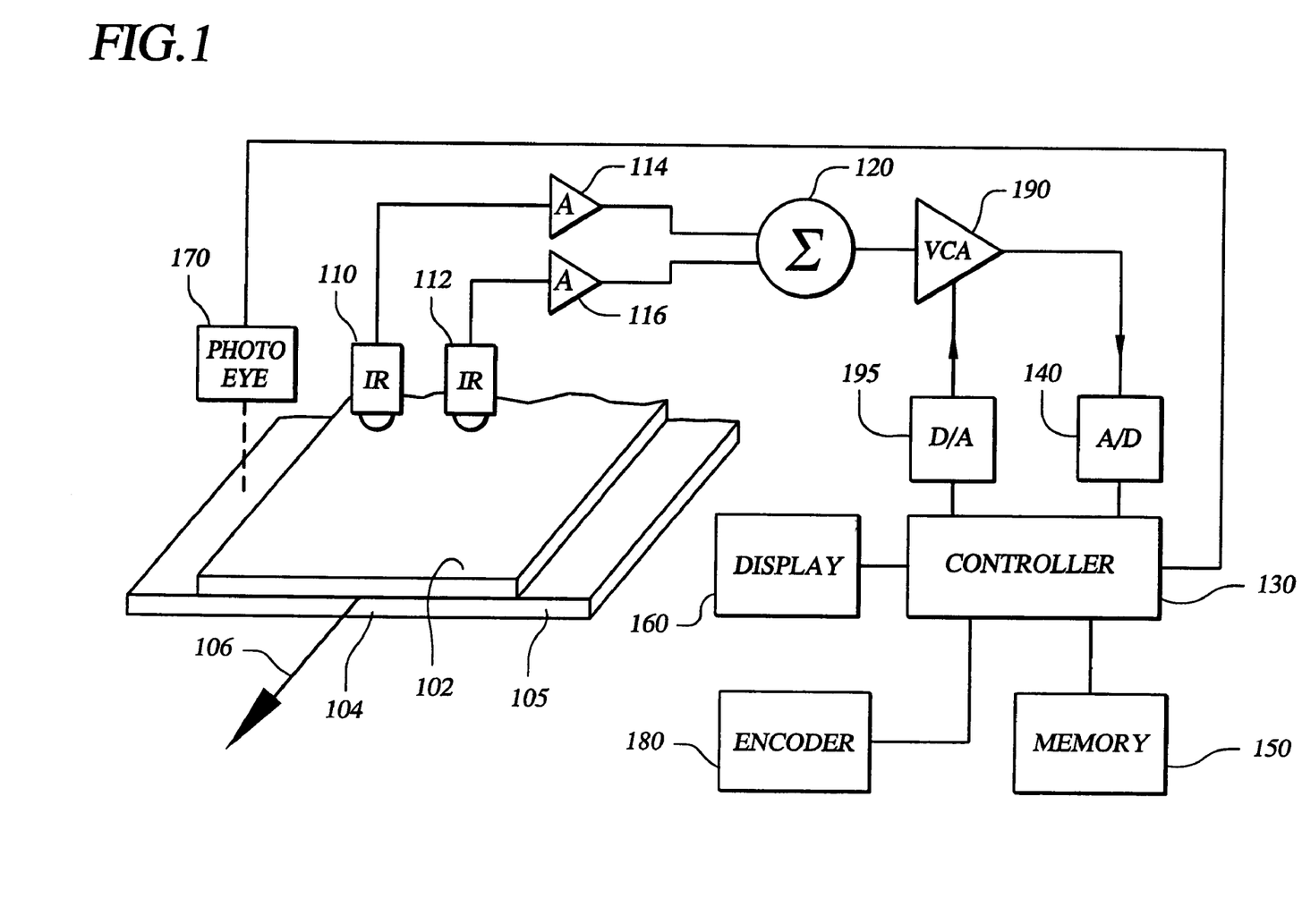
FIG. 1 is a sectional view of an exemplary thermal sensing system for detecting target articles.

FIG. 1 is an exemplary thermal sensing system for detecting target articles, or targets, at temperatures different than ambient temperature, for example, a hot melt adhesive 102 deposited onto a moving substrate or packaging 104 as illustrated in FIG. 1. In other applications, the thermal sensing systems of the present disclosure are useful for detecting substances, other than hot melt adhesives. These and other applications will become more fully apparent to those having ordinary skill in art in view of the discussion of the exemplary embodiments below.

In one embodiment of the disclosure, the thermal sensing system comprises generally a plurality of at least two thermal sensors mounted in or on a mounting member, for example, one positionable relative to the target to be detected thereby. The plurality of sensors are preferably oriented non-parallel to a direction of relative motion between the sensors and the target. These and other aspects of the disclosure are discussed more fully below. The number of sensors depends generally upon the width of the detected target.

In one embodiment suitable for detecting hot melt adhesives and other applications, the thermal sensors are infrared-heat detecting sensors. The TH Series of infrared thermal sensors, for example, Part Number TH-11, by SUNX Sensors USA, West Des Moines, Iowa 50265 are especially well suited for hot melt glue sensing applications. The TH-11 series hot melt glue sensor includes a controller that stores pre-set programmed settings for different applications and produces a red alignment spot on the target to facilitate alignment and focused detection. Other specialty sensors, a variety of which are available from SUNX Sensors USA and other manufacturers, may be better suited for applications other than hot melt adhesive detection.

Although the exemplary plurality of thermal sensors comprise discrete sensors, other embodiments may employ a single sensor capable of detecting more than one location and producing corresponding outputs, which may be summed together as discussed further below. Such a unitary sensor with multiple sensors inputs and corresponding outputs is considered, at least for the present disclosure, to be equivalent to multiple discrete sensors of the exemplary type.

In FIG. 1, the exemplary sensors 110 and 112 are mounted side-by-side substantially transversely to a direction 106 of substrate movement, thereby enabling the detection of a relatively wide area of the target. In other embodiments, however, the thermal sensors may move relative to a stationary thermal target. In these latter embodiments, the thermal sensors are also disposed non-parallel to the direction of relative motion.

Figure 2:
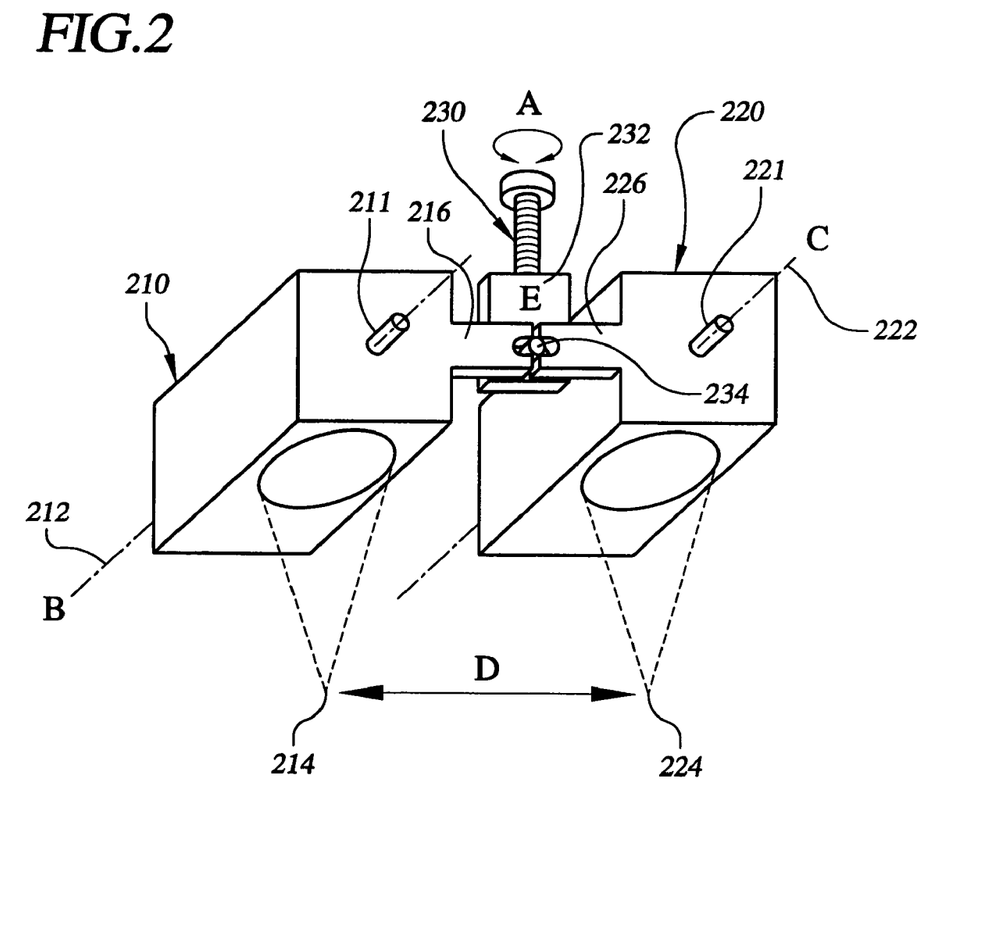
FIG. 2 is an exemplary arrangement of a plurality of adjustable thermal sensors.

FIG. 2 illustrates first and second sensors 210 and 220 pivotally adjustable about corresponding axes 212 and 222, respectively. The pivot axes are substantially parallel to the direction of relative motion between the sensors and the target, indicated as direction 106 in FIG. 1. Thus configured, the sensors 210 and 220 are adjustably positionable to change the spacing D between areas of the target detected by the sensors. In the exemplary illustration, the focus of each of the sensors, 210 and 220, is positionable toward and away from the other, increasing or decreasing the spacing D between the focus points 214 and 224.

In the exemplary embodiment of FIG. 2, the thermal sensors 210 and 220 are pivotally supported on a support member or mounting bracket, not shown, by corresponding pivots 211, 221 extending along the corresponding pivot axes 212 and 222, respectively. In the exemplary embodiment, a lever arm 216, 226 extending from each of the sensors 210, 220 is coupled to a common adjustment member 230 for adjustably pivoting the thermal sensors 210 and 220 about the corresponding pivot axes.

In FIG. 2, the exemplary common adjustment member 230 includes a translating member 232 having an engagement member 234 coupled to the lever arms 216, 226 of the thermal sensors. The engagement member 234 is in the form of a protruding portion movably coupled to the lever arms. In other embodiments, each arm 216, 226 may be coupled to the translating member by a corresponding engagement member. The exemplary translating member 232 reciprocates back and forth, for example, by turning a jack screw 236 threadedly engaged therewith. Reciprocation of the translating member pivots the thermal sensors about the axes 212 and 222, thereby adjusting the distance D between the focal points of the sensors. In other embodiments, the thermal sensors may by adjustable independently. Also, other adjustment apparatuses may be used to orient the thermal sensor relative to the target article.

In FIG. 1, an electrical schematic diagram of an exemplary thermal sensing system comprises generally a plurality of at least two 110 and 112 having outputs coupled to a summer circuit 120. In the exemplary embodiment, the analog outputs of the sensors 110 and 112 are amplified by corresponding amplifiers 114 and 116, respectively, before being input to the adder circuit. In the exemplary system, the summer circuit output is coupled to an input of a digital controller 130, for example, a micro-controller, after digitization by an analog-to-digital converter 140. In other embodiments, additional thermal sensors may be included and the outputs thereof may summed at the same summer 120, or at another summer, and then input to the controller 130.

The micro-controller is coupled to memory 150, including read-only memory (ROM) and possibly programmable ROM (PROM) and RAM for storing data. In some embodiments the controller is coupled to a display device 160, for example, a liquid crystal (LCD) display or a cathode ray tube (CRT). In this exemplary embodiment, the controller is programmed, for example, by an application program stored in ROM or in a PROM, to sample the digitized output of the summer 120 and store the sampled summer output data in memory. Those having ordinary skill in the art will appreciate that the exemplary digital implementation herein has analog equivalents.

In some embodiments, it is desirable initially to detect the presence of the product or target to be detected by the thermal sensors. In FIG. 1, a photo-detector 170 trained on the target has an output coupled to the controller 130. In embodiments where the controller is a digital processor, the output of the photo-detector 170 is digitized before being input to the controller.

The exemplary system of FIG. 1 also includes an encoder 180 having an output coupled to an input to the controller. The encoder 180 is, for example, a rotary mechanical encoder or an optical encoder for measuring the relative motion between the thermal sensors and the target. This information may be used for example to compute the rate at which the target moves relative to the thermal sensors as discussed more fully below.

Figure 3:
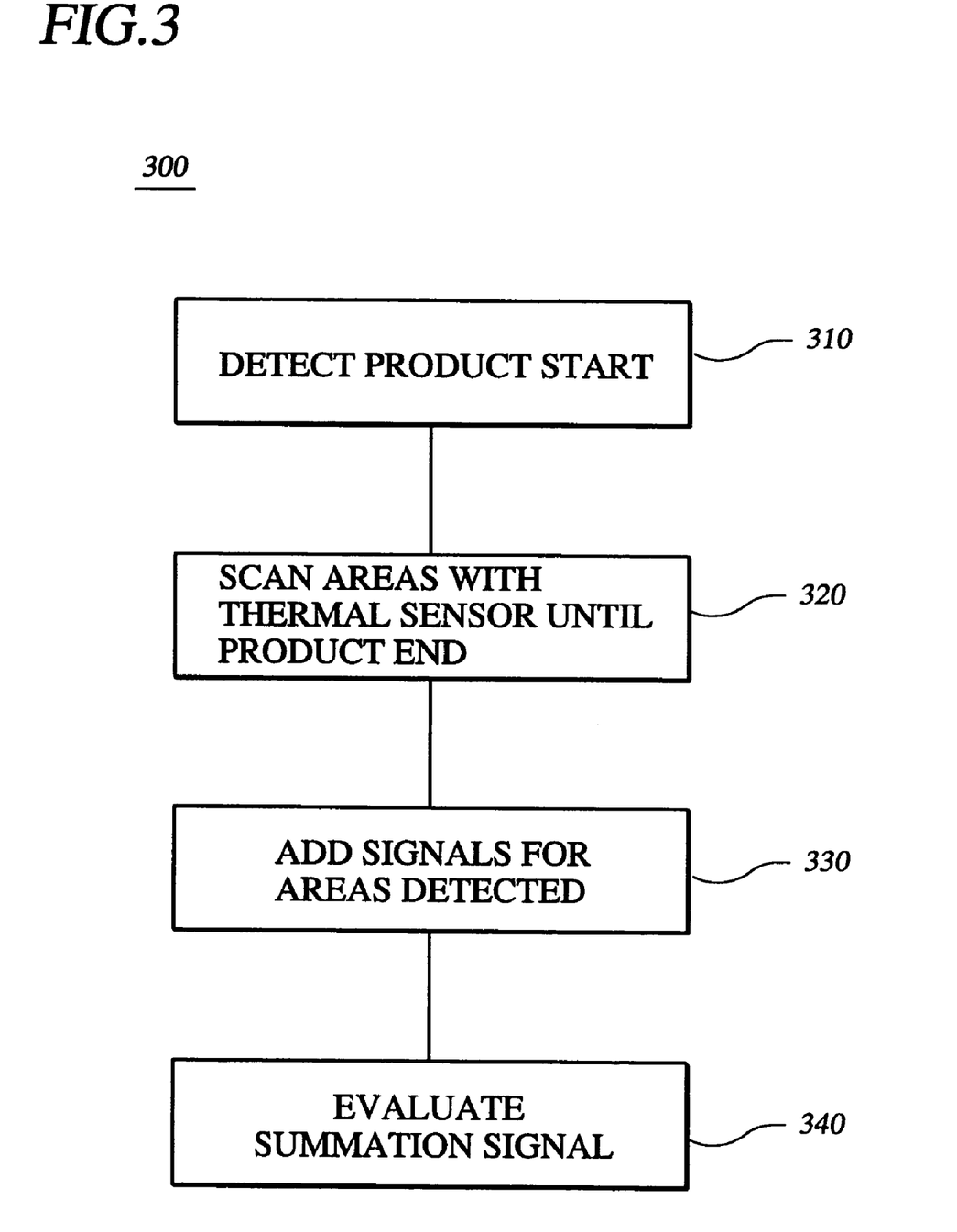
FIG. 3 is an exemplary process flow diagram for sensing articles with thermal sensing systems according to the present disclosure.

FIG. 3 is an exemplary process flow diagram 300 illustrating generally the operative function of the thermal sensing systems of the present disclosure. In some embodiments, it is desirable to detect the beginning and end of the product on which the target should be deposited. In FIG. 3, at block 310, this may be performed by detecting the leading edge of the product, and then detecting the trailing edge thereof. In FIG. 1, the leading edge 105 of the exemplary product 104 is detected with the photo-eye 170, which is also capable of detecting the trailing edge thereof.

In some embodiments, detection of the product leading edge may be used to initiate the thermal sensing operation, which is discussed further below. Detection of the trailing edge of the product may be used to terminate the thermal sensing operation. In FIG. 3, at block 320, the product is scanned with the thermal sensors until the trailing edge of the product run is complete, for example, until the trailing edge of the product is detected by the photo-eye 170 in FIG. 1.

In some embodiments, the product leading edge detection event may be stored in memory for use as a reference, for example, relative to the product trailing detection event. Use of encoder outputs that track the movement of the product may be used with the leading and trailing edge detection events to compute the length of the product. The measured product length may then be compared with a known product length. The computed product length may also be compared with outputs of the thermal sensors to determine whether the product has been covered adequately by the target material.

In one mode of operation, at least two adjacent areas of the target are detected by the plurality of thermal sensors. As noted above, broader areas may be detected by using additional sensors, or pairs of sensors. In the exemplary embodiment, at least two separate areas of the adhesive material are detected by sensing changes in temperature with a corresponding number of thermal sensors arranged non-parallel to a direction of relative motion between the detector and the adhesive material. The thermal sensors generally detect the target material, for example, the hot melt adhesive of FIG. 1, by detecting the target at a temperature relative to the area around the target. The thermal sensors thus produce electrical signals corresponding to changes in temperature at two separate locations along the target.

In FIG. 3, at block 330, the output signals of the at least two sensors scanning the moving target are summed or added together. In FIG. 1, the amplified analog output of the sensors is added at the summer 120. In FIG. 1, the digitized output of the summer circuit is sampled by the controller and stored in memory. In the exemplary digital implementation, the sampling and storage of the summed sensor signal is performed by a sampling application program segment, stored in memory.

In some embodiments, it is desirable to sample the summed output at a rate dependent on the relative motion between the detector and the adhesive material, thus sampling the summation of the sensor outputs at regular distance intervals along the target. In one embodiment, illustrated in FIG. 1, the encoder 180 measures the relative motion between the sensor and the target for use by the controller to schedule sampling of the summer output at some desired fixed spacing. The sampled data is stored in RAM, for example, in a tabular form.

In FIG. 3, at block 340, the output of the summer circuit is evaluated, for example, by comparing the summed output of the at least two thermal sensors with a reference. In one embodiment, a reference is establish empirically by taking measurements where there is no hot melt adhesive and where there is adhesive. The references will be somewhat between low and high measurements, depending upon the requirements of the particular application, as discussed further below.

Upon establishing the reference, the sampled summer output data are compared relative to the reference by counting how many readings are above or below the reference, for example, on a per unit length basis, and then assessing the compared results relative to a tolerance, which may also be determined empirically. In the exemplary embodiment, the comparison is controlled by a comparison program segment, stored in memory, that compares stored samples of the summation of at least two thermal sensor signals with a stored reference.

In one embodiment, the reference is determined by operating in a teach mode. In teach mode, upon establishing stable thermal sensor readings, the controller successively adjusts the gain of the summer signal output to optimize the span of temperature readings. The gain of the summer output may also be adjusted in teach mode to adapt to different target conditions, for example, different temperature output ranges or adhesive glue thickness. For this adjustment, the controller increases or decreases the amplifier gain based on the maximum temperature readings, thus shifting the range of readings to a more optimal range, for example, to better differentiate the temperature readings from noise.

In FIG. 1, a variable gain amplifier 190, for example a voltage controlled amplifier, coupled to the output of the summer 120 is adjusted by the controller 130, via a digital to analog (D/A) converter 195 during the teach mode.

Figure 4:
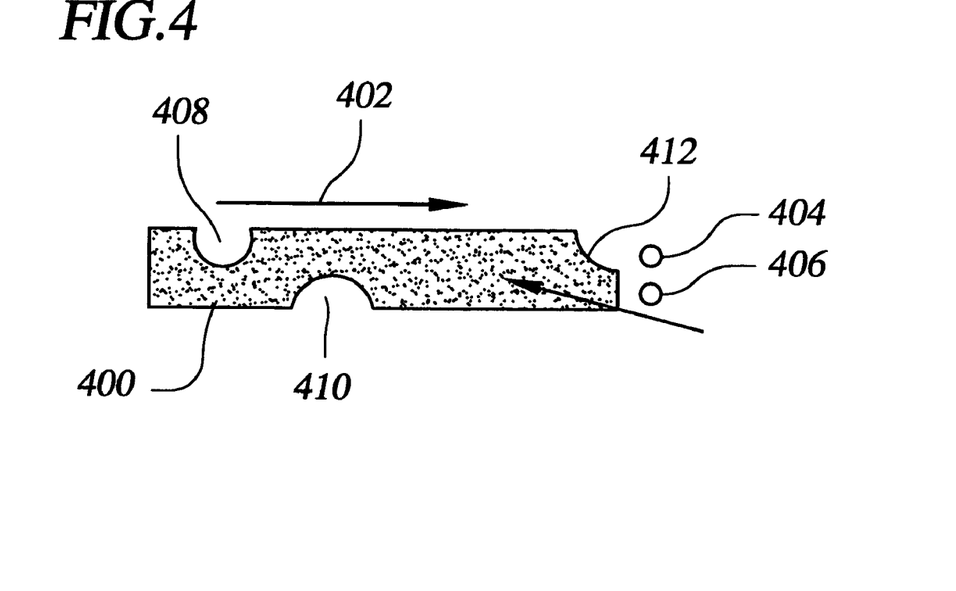
FIG. 4 is an exemplary target and thermal sensor configuration.

FIG. 4 illustrates an exemplary hot melt glue target 400 moving in a direction 402 relative to thermal sensors 404 and 406, the outputs of which are summed, sampled and stored as discussed above. The glue target includes voids 408, 410 and 412 where glue was not deposited, for example due to an obstructed glue nozzle or for some other reason.

Figure 5:
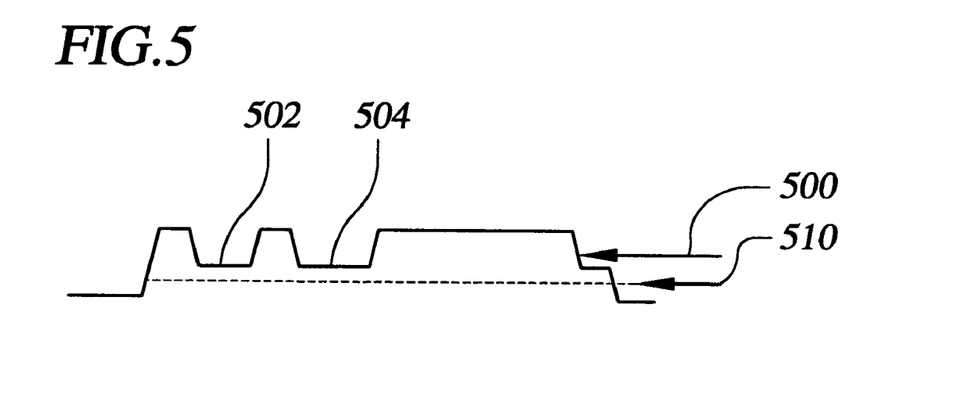
FIG. 5 is a graphical representation of a summed sensor signal plotted relative to a reference signal.
Figure 6:
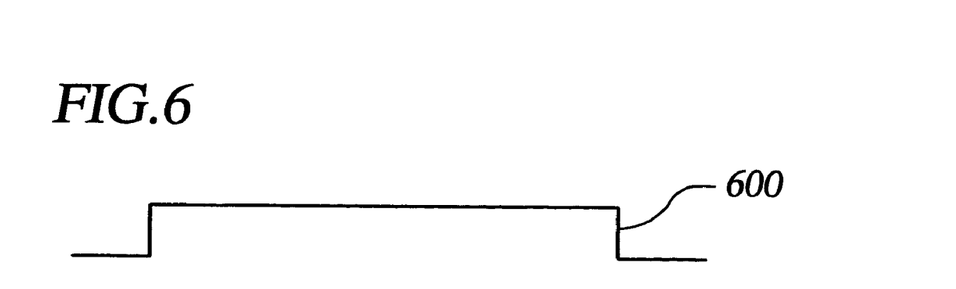
FIG. 6 is a plot of a signal indicative of results of the comparison of the summed signal with the reference signal of FIG. 5.

FIG. 5 is a graphical illustration of a summed sensor output signal 500 corresponding to the summed outputs of sensors 404 and 406 in FIG. 4. The glue voids 408, 410 and 412 in FIG. 4 reduce the amplitude of the summation signal 500 in FIG. 5. FIG. 5 also illustrates a reference or threshold level 510, against which the signal 500 is compared. In FIG. 5, the reference is chosen so that the signal 500 will exceed the reference as long as at least one of the two thermal sensors detects glue at any given time. FIG. 6 illustrates a comparison output 600 that is high when the signal 500 in FIG. 5 exceeds the reference 510. The comparison output 600 in FIG. 6 is low when the signal 600 does not exceed the reference 510 in FIG. 5.

Figure 7:
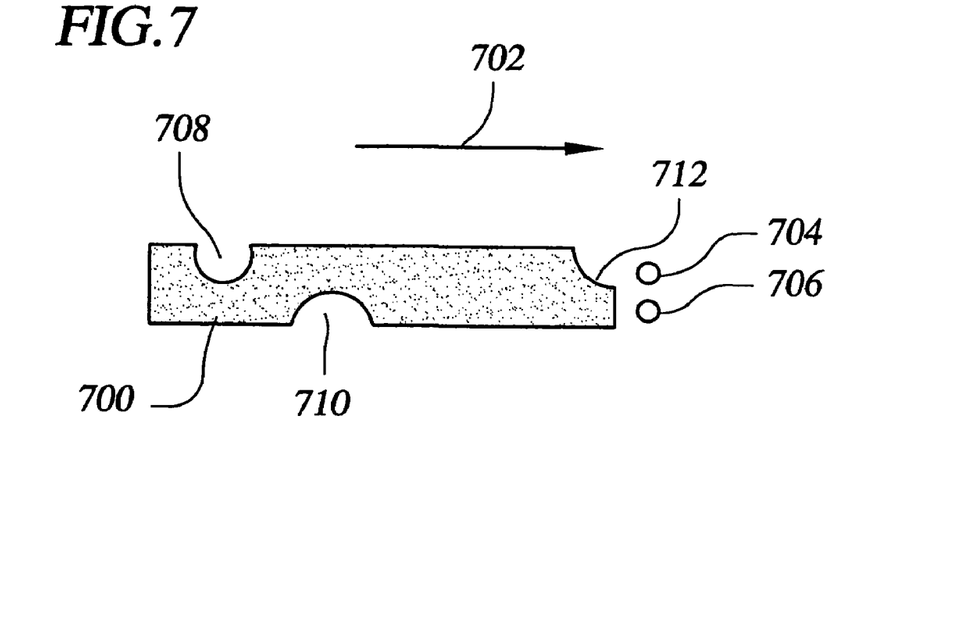
FIG. 7 is another exemplary target and thermal sensor configuration.

FIG. 7 illustrates another exemplary hot melt glue target 700 moving in a direction 702 relative to thermal sensors 704 and 706, the outputs of which are summed, sampled and stored as discussed above. The glue target also includes voids 708, 710 and 712 where glue is not deposited.

Figure 8:
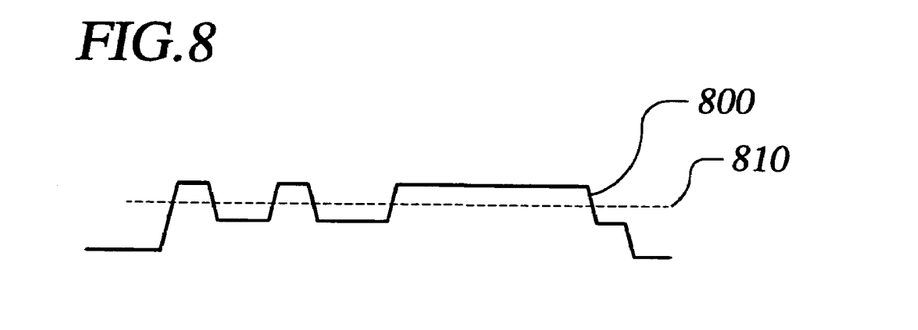
FIG. 8 is a graphical representation of a summed sensor signal plotted relative to a different reference signal.
Figure 9:
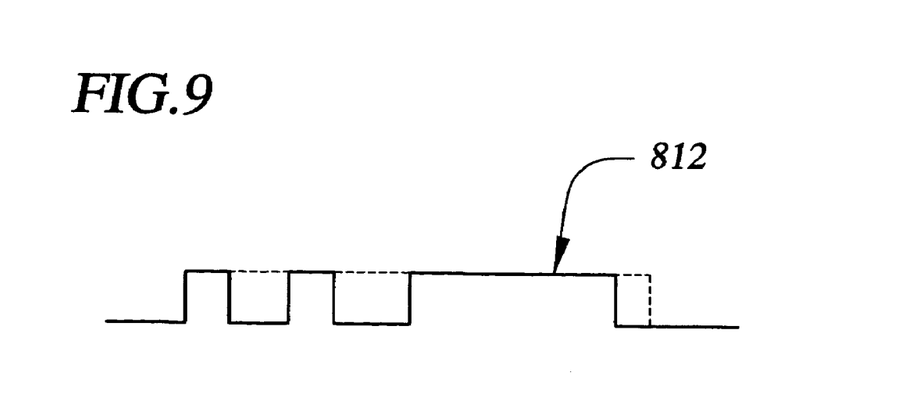
FIG. 9 is a plot of a signal indicative of results of the comparison of the summed signal with the reference signal of FIG. 8.

FIG. 8 is a graphical illustration of a summed sensor output signal 800 corresponding to the summed outputs of sensors 704 and 706 in FIG. 7. The glue voids in FIG. 7 reduce the amplitude of the summation signal 800 in FIG. 8. FIG. 8 also illustrates a reference or threshold level 810, against which the signal 800 is compared. In FIG. 8, the reference is chosen so that the signal 800 will exceed the reference only when both sensors detect glue at the same given time. If either of the two sensors does not detect glue, the summed signal 800 drops below the reference 810. FIG. 9 illustrates a comparison output 812 that is high when the signal 800 in FIG. 8 exceeds the reference 810. The comparison output 812 in FIG. 9 is low when the summed signal 800 does not exceed the reference 810.

Figure 10:
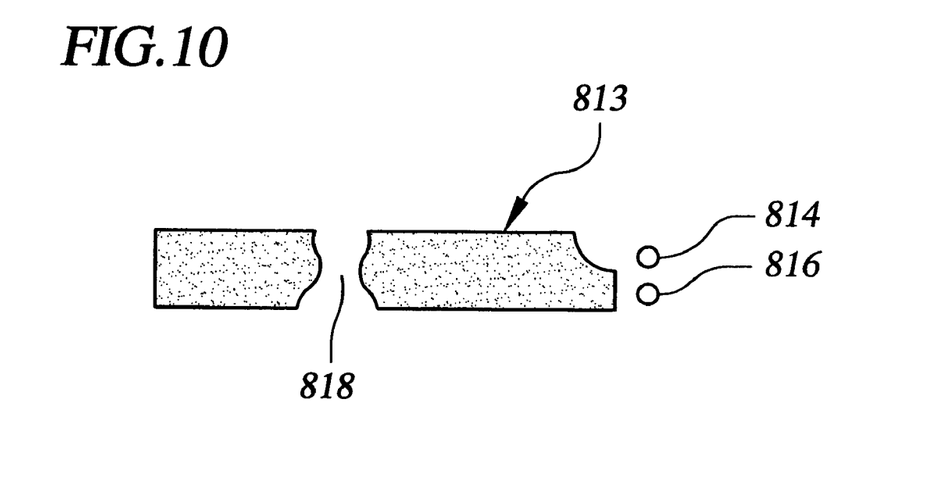
FIG. 10 is another exemplary target and thermal sensor configuration.

FIG. 10 illustrates another exemplary hot melt glue target 813 moving in a direction relative to thermal sensors 814 and 816, the outputs of which are summed, sampled and stored as discussed above. The glue target includes a discontinuity 818, where glue is not deposited, extending across the target area in the path of both sensors 814 and 816.

Figure 11:
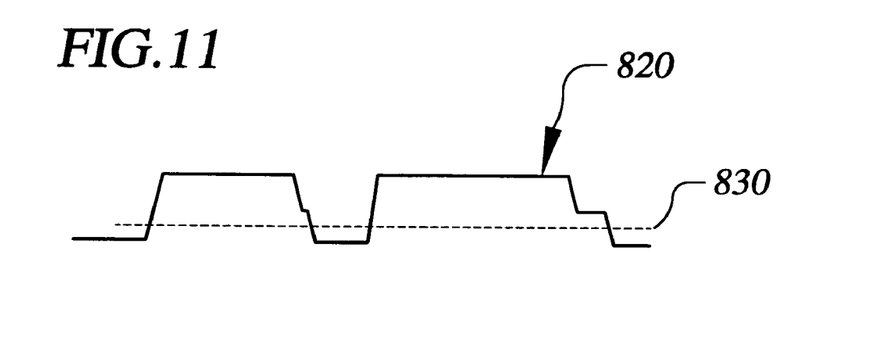
FIG. 11 is a graphical representation of a summed sensor signal plotted relative to a different reference signal.
Figure 12:
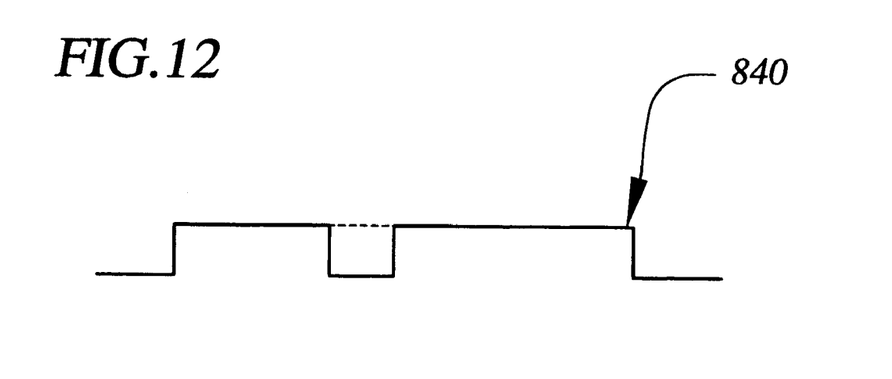
FIG. 12 is a plot of a signal indicative of results of the comparison of the summed signal with the reference signal of FIG. 11.

FIG. 11 is a graphical illustration of a summed sensor output signal 820 corresponding to the summed outputs of sensors 814 and 816 in FIG. 10. The glue void 818 in FIG. 10 reduces the amplitude of the summation signal 820 in FIG. 11. FIG. 11 also illustrates a reference or threshold level 830, against which the signal 820 is compared. In FIG. 11, the reference is chosen so that the signal 820 will exceed the reference when at least one sensor detects glue. However, if both sensors fail to detect glue, the summed signal output 820 drops below the reference 830. FIG. 12 illustrates a comparison output 840 that is high when the signal 820 in FIG. 11 exceeds the reference 830. The comparison output 840 in FIG. 12 is low when the summed signal 820 does not exceed the reference 830.

In the exemplary embodiments, all amplitude data points of the summed thermal signal outputs are not stored. Instead the summed signal is sampled and stored for comparison with the corresponding references. In one embodiment, a tolerance establishes the acceptable number of signal samplings that may not exceed the reference on a per unit length basis. In hot melt glue applications, the results of the sensor signal evaluation may be used to determine whether an adequate amount of glue has been deposited. In the exemplary digital implementation, a tolerance program segment stored in memory compares the results of the comparison program segment with a user specified tolerance.

In one embodiment, a product on which the target is disposed is detected, for example, with a photo-detector that detects the leading and trailing edges thereof, and detecting a hot melt glue, or other target, disposed on the product is also detected while detecting the product. It may be determined with the hot melt glue completely coats the product by comparing a period during which the product is detected with a period during which the hot melt glue is detected. Additional information may be obtained about the application of the adhesive on the product by also using the encoder, for example, which portions of the product are coated with adhesive and which one are not.

While the foregoing written description of the disclosure enables one of ordinary skill to make and use what are considered presently to be the best modes thereof, those of ordinary skill will understand and appreciate the existence of variations, combinations, and equivalents of the specific exemplary embodiments herein. The disclosure is therefore to be limited not by the exemplary embodiments herein, but by all embodiments within the scope and spirit of the appended claims.

What is claimed is:

1. A method in a hot melt adhesive detection system, comprising:
   providing relative motion between a hot melt adhesive detector and an adhesive material;
   detecting at least two separate areas of the adhesive material by sensing changes in temperature with a corresponding number of thermal sensors of the detector arranged non-parallel to a direction of relative motion between the detector and the adhesive material;
   summing an output of the at least two thermal sensors;
   sampling the summed output of the at least two thermal sensors;
   comparing the samplings with a reference;
   determining the number of samplings that are less than the reference, evaluating the adhesive material by comparing the number of samplings that are less than the reference with a predefined tolerance.

2. The method of claim 1, storing samplings of the summed output of the at least two thermal sensors.

3. The method of claim 1, sampling the summed output of the at least two thermal sensors at fixed intervals along the direction of relative motion between the detector and the adhesive material.

4. The method of claim 1, changing a spacing between adjacent detection points of the adhesive material by orienting the at least two thermal sensors about a pivot axis.

5. The method of claim 1, sampling the summed output of the at least two thermal sensors independent of a rate of relative motion between the detector and the adhesive material.

6. The method of claim 5, sampling the summed output of the at least two thermal sensors independent of a rate of relative motion between the detector and the adhesive material by sampling relative to an encoder signal that is proportional to the rate of relative motion between the detector and the adhesive material.

7. A method in a thermal detection system, comprising:
   producing electrical signals corresponding to changes in temperature at two separate locations of a target detected by different sensors;
   summing the electrical signals corresponding to the changes in temperature of the two separate locations of the target;
   sampling summations of the electrical signals corresponding to the changes in temperature of the two separate locations of the target;
   storing the sampled summations of the electrical signals corresponding to the changes in temperature of the two separate locations of the target;
   comparing the stored and sampled summations of the electrical signals corresponding to the changes in temperature of the two separate locations of the target with a reference;
   evaluating the comparison of the stored sampled summations of the electrical signals corresponding to the changes in temperature of the two separate locations of the target relative to a predefined tolerance.

8. The method of claim 7, the target disposed on a product, detecting the product, comparing a period during which the electrical signals are summed with a period during which the product is detected.

9. The method of claim 7, sampling the summations of the electrical signals corresponding to the changes in temperature of the two separate locations of the target at fixed intervals along a direction of movement of the target.

10. The method of claim 9, sampling the summations of the electrical signals corresponding to the changes in temperature of the two separate locations of the target independent of a rate of relative motion between the detector and the target.

11. A method in a thermal detection system, comprising:
    detecting a product;
    detecting hot melt glue disposed on the product while detecting the product;
    comparing a period during which the product is detected with a period during which the hot melt glue is detected;
    detecting the hot melt glue with a plurality of at least two thermal sensors that produce corresponding electrical signals indicative of the presence of the hot melt glue;
    summing the electrical signals.

* * * * *